United States Patent
Wang et al.

(10) Patent No.: US 12,538,336 B2
(45) Date of Patent: Jan. 27, 2026

(54) SIDELINK RESOURCE SELECTION METHOD AND TERMINAL

(71) Applicant: VIVO MOBILE COMMUNICATION CO., LTD., Dongguan (CN)

(72) Inventors: Huan Wang, Dongguan (CN); Zichao Ji, Dongguan (CN); Shuyan Peng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 387 days.

(21) Appl. No.: 18/157,153

(22) Filed: Jan. 20, 2023

(65) Prior Publication Data

US 2023/0156750 A1     May 18, 2023

Related U.S. Application Data

(63) Continuation of application No. PCT/CN2021/108619, filed on Jul. 27, 2021.

(30) Foreign Application Priority Data

Jul. 27, 2020 (CN) .......................... 202010734466.X

(51) Int. Cl.
    *H04W 4/00*         (2018.01)
    *H04W 72/40*       (2023.01)

(52) U.S. Cl.
    CPC .................................. *H04W 72/40* (2023.01)

(58) Field of Classification Search
    CPC .. H04L 5/0078; H04W 72/02; H04W 72/044; H04W 72/40; H04W 72/12; H04W 72/04;
    (Continued)

(56) References Cited

U.S. PATENT DOCUMENTS

2017/0142741 A1*    5/2017   Kaur ................... H04W 72/121
2018/0234947 A1*    8/2018   Wu ........................ H04W 72/40
(Continued)

FOREIGN PATENT DOCUMENTS

CN           111385885 A        7/2020
CN           111436140 A        7/2020
(Continued)

OTHER PUBLICATIONS

European Patent Office, Extended European Search Report issued in corresponding Application No. EP 21850019, dated Nov. 23, 2023.
(Continued)

*Primary Examiner* — Shantell L Heiber
(74) *Attorney, Agent, or Firm* — Stites & Harbison, PLLC; Jeffrey A. Haeberlin

(57) ABSTRACT

This application discloses a sidelink resource selection method and a terminal. The sidelink resource selection method includes: determining a resource selection mode usable for a target operation, where the resource selection mode includes a first resource selection mode and a second resource selection mode, and resource selection assistance information is considered for use of the second resource selection mode; in a case that both the first resource selection mode and the second resource selection mode are usable for the target operation, determining, in a first manner, a
(Continued)

resource selection mode used for the target operation; and performing the target operation by using the resource selection mode determined.

20 Claims, 5 Drawing Sheets

(58) Field of Classification Search
CPC ..... H04W 72/50; H04W 16/04; H04W 76/14; H04W 28/06; H04W 28/16; H04W 52/0216; H04W 52/0245
See application file for complete search history.

(56) References Cited

U.S. PATENT DOCUMENTS

| | | | |
|---|---|---|---|
| 2019/0394786 A1* | 12/2019 | Parron | H04W 4/46 |
| 2020/0236654 A1 | 7/2020 | Hong et al. | |
| 2020/0260246 A1* | 8/2020 | Tang | H04W 4/70 |
| 2023/0276472 A1* | 8/2023 | Hu | H04W 72/02 370/230 |

FOREIGN PATENT DOCUMENTS

| | | |
|---|---|---|
| WO | 2019/084927 A1 | 5/2019 |
| WO | 2020/087212 A1 | 5/2020 |
| WO | 2020/132284 A1 | 6/2020 |

OTHER PUBLICATIONS

Japan Patent Office, First Office Action issued in corresponding Application No. JP 2023-505737, dispatched Jan. 16, 2024. (Translation not available.).

China National Intellectual Property Administration, International Search Report issued in corresponding Application No. PCT/CN2021/108619, mailed Oct. 9, 2021.

Fraunhofer HHI, et al., Resource Allocation for Mode 2 NR V2X, 3GPP TSG-RAN WG2 Meeting #106, R2-1907080. Reno, USA, May 13-17, 2019. See: ISR.

Directorate General of Intellectual Property, Ministry of Law, Republic of Indonesia, Office Action issued in corresponding Application No. P00202300979 dated Aug. 12, 2025. (English translation not readily available.).

* cited by examiner

SIDELINK RESOURCE SELECTION METHOD AND TERMINAL

CROSS-REFERENCE TO RELATED APPLICATIONS

This application is a continuation of International Application No. PCT/CN2021/108619, filed on Jul. 27, 2021, which claims priority to Chinese Patent Application No. 202010734466.X, filed in China on Jul. 27, 2020, which are incorporated herein by reference in their entireties.

TECHNICAL FIELD

This application relates to the field of wireless communications technologies, specifically, to a sidelink resource selection method and a terminal.

BACKGROUND

New radio (NR) sidelink (SL) supports two resource selection modes: one is based on base station scheduling (mode 1), and the other is based on user equipment (UE, also referred to as terminal) autonomous selection (mode 2). In the resource selection mode based on base station scheduling, a sidelink resource used by UE for data transmission is determined by a base station, and notified to transmit (TX) UE by using downlink signaling. In the resource selection mode based on UE autonomous selection, the UE selects an available transmission resource from a (pre-)configured resource pool; and the UE performs channel monitoring before resource selection, selects a candidate resource set with less interference based on a channel monitoring result, and then randomly selects, from the candidate resource set, a resource for transmission.

3GPP is on the point of discussing enhancements to the resource selection mode 2. The following options are available: UE-A determines a recommended resource set and notifies UE-B of the recommended resource set, and UE-B may consider the recommended resource set notified by UE-A during resource selection in the mode 2.

Since different candidate resource sets are obtained based on an existing resource selection mode 2 and an enhanced resource selection mode 2, if the UE randomly uses the existing or enhanced resource selection mode for resource selection, transmission reliability cannot be ensured.

In addition, when the UE determines resource preemption and/or resource selection re-evaluation, there may be at least two different bases for determining whether to perform resource re-selection. In a case that the UE performs unnecessary resource re-selection after obtaining such ambiguous bases, overall transmission reliability of a system is compromised; or in a case that the UE fails to reselect resources in a timely manner when resource re-selection is needed, transmission performance of the system or another UE is deteriorated.

In addition, the UE may perform resource reservation. It is assumed that the UE uses the existing resource selection mode for resource selection, and selected resources are reserved. When transmitting a new transport block (TB), the UE may need to use the enhanced resource selection mode. In this case, the reserved resources may no longer be suitable for the new transmission, and therefore resource re-selection needs to be triggered.

SUMMARY

According to a first aspect of the present disclosure, a sidelink resource selection method applied to a terminal is provided and includes:

determining a resource selection mode usable for a target operation, where the resource selection mode includes a first resource selection mode and a second resource selection mode, and resource selection assistance information is considered for use of the second resource selection mode;

in a case that both the first resource selection mode and the second resource selection mode are usable for the target operation, determining, in a first manner, a resource selection mode used for the target operation; and performing the target operation by using the resource selection mode determined.

According to a second aspect of the present disclosure, a sidelink resource selection apparatus is provided and includes:

a first determining module, configured to determine a resource selection mode usable for a target operation, where the resource selection mode includes a first resource selection mode and a second resource selection mode, and resource selection assistance information is considered for use of the second resource selection mode;

a second determining module, configured to: in a case that both the first resource selection mode and the second resource selection mode are usable for the target operation, determine, in a first manner, a resource selection mode used for the target operation; and a third determining module, configured to perform the target operation by using the resource selection mode determined.

Optionally, the first manner includes one of the following:

being content that is specified by a protocol, configured by a control node, pre-configured by a control node, or indicated by another terminal; and being implemented by the terminal.

Optionally, the content that is configured by the control node or indicated by another terminal includes the resource selection assistance information.

Optionally, the resource selection mode used for the target operation that is determined in the first manner includes one of the following:

the first resource selection mode;

a mode including at least the first resource selection mode;

the second resource selection mode;

a mode including at least the second resource selection mode; and the first resource selection mode and the second resource selection mode.

Optionally, the target operation includes at least one of the following:

initial resource selection;

resource selection re-evaluation;

resource preemption detection; and resource re-selection.

Optionally, the first determining module is configured to determine whether the second resource selection mode is usable for the target operation.

Optionally, the first determining module includes one of the following:

a first determining sub-module, configured to determine, based on whether a preset condition is satisfied, whether the second resource selection mode is usable for the target operation;

a second determining sub-module, configured to determine, based on the terminal implementation, whether the second resource selection mode is usable for the target operation; and a third determining sub-module, configured to determine, based on whether a preset condition and a first pre-determined rule are satisfied, whether the second resource selection mode is usable for the target operation.

Optionally, the preset condition is specified by a protocol, configured by a control node, pre-configured by a control node, or indicated by another terminal.

Optionally, the preset condition includes at least one of the following:
  time domain resource condition;
  frequency domain resource condition;
  characteristic of a to-be-transmitted MAC PDU or transport block;
  transmission type, where the transmission type includes at least one of unicast, groupcast, and broadcast;
  capability or type supported by the terminal and/or a receive terminal; and
  state of the terminal and/or the receive terminal being in a coverage area of a specified cell or in a coverage area of a specified sidelink synchronization signal.

Optionally, the target operation is resource selection re-evaluation or resource preemption detection, and the first pre-determined rule includes at least one of the following:
  the resource selection re-evaluation or the resource preemption detection uses a same resource selection mode as the initial resource selection; or
  a same resource selection mode is used for multiple sidelink transmission resources of one transport block.

Optionally, the third determining module is configured to: in a case that either the first resource selection mode or the second resource selection mode is used for performing the target operation, determine, by using the resource selection mode used, whether to trigger resource re-selection.

Optionally, the third determining module is configured to: in a case that both the first resource selection mode and the second resource selection mode are used for performing the target operation, determine, by using the first resource selection mode and the second resource selection mode, whether to trigger resource re-selection; or
  the third determining module is configured to: in a case that both the first resource selection mode and the second resource selection mode are used for performing the target operation, determine, by using either the first resource selection mode or the second resource selection mode, whether to trigger resource re-selection; or
  the third determining module is configured to: in a case that both the first resource selection mode and the second resource selection mode are used for performing the target operation, determine, by using at least one of the first resource selection mode and the second resource selection mode, whether to trigger resource re-selection.

Optionally, the sidelink resource selection apparatus further includes:
  a fourth determining module, configured to: in a case that either the first resource selection mode or the second resource selection mode is used for performing the target operation and that resource re-selection is triggered, perform resource re-selection in a candidate resource set determined by using the resource selection mode used.

Optionally, the sidelink resource selection apparatus further includes:
  a fifth determining module, configured to: in a case that both the first resource selection mode and the second resource selection mode are used for performing the target operation and that the first resource selection mode and the second resource selection mode both trigger resource re-selection, determine, in a second manner, a target candidate resource set used for resource re-selection.

Optionally, the second manner includes one of the following:
  being specified by a protocol, being configured by a control node, being pre-configured by a control node, or being indicated by another terminal;
  being implemented by the terminal; and
  using a second pre-determined rule.

Optionally, the second pre-determined rule includes: using a candidate resource set, from which sidelink transmission resources that meet a HARQ RTT condition are able to be selected, as the target candidate resource set.

Optionally, the target candidate resource set is one of the following:
  a candidate resource set determined by using the first resource selection mode;
  a candidate resource set determined by using the second resource selection mode; and
  a candidate resource set determined by using the first resource selection mode and the second resource selection mode.

Optionally, the sidelink resource selection apparatus further includes:
  a sixth determining module, configured to: in a case that both the first resource selection mode and the second resource selection mode are used for performing the target operation and that either the first resource selection mode or the second resource selection mode triggers resource re-selection, determine a target candidate resource set based on the candidate resource set determined by using the first resource selection mode and the second resource selection mode.

Optionally, in a case that the target candidate resource set is determined by using the first resource selection mode and the second resource selection mode, the target candidate resource set is an intersection or a union of candidate resource sets determined by using the first resource selection mode and the second resource selection mode.

Optionally, the sidelink resource selection apparatus further includes:
  a transmitting module, configured to: in a case that the second resource selection mode is used for performing the target operation, transmit signaling to a receive terminal so as to trigger the receive terminal to report the resource selection assistance information.

Optionally, in a case that the target operation is resource re-selection, the sidelink resource selection apparatus further includes:
  a seventh determining module, configured to: in a case that sidelink transmission resources reserved by the terminal are not in a recommended resource set, determine to trigger resource re-selection; or
  an eighth determining module, configured to: in a case that sidelink transmission resources reserved by the terminal are in a recommended resource set, determine to trigger resource re-selection.

According to a third aspect of the present disclosure, a terminal is provided. The terminal includes a processor, a memory, and a program or instructions stored in the memory and capable of running on the processor. When the program or instructions are executed by the processor, the steps of the method according to the first aspect are implemented.

According to a fourth aspect of the present disclosure, a readable storage medium is provided. The readable storage medium stores a program or instructions, and when the program or instructions are executed by a processor, the steps of the method according to the first aspect are implemented.

According to a fifth aspect of the present disclosure, a chip is provided. The chip includes a processor and a communications interface. The communications interface is coupled to the processor, and the processor is configured to run a program or instructions on a network-side device so as to implement the method according to the first aspect.

According to a sixth aspect of the present disclosure, a program product is provided. The program product is stored in a non-volatile storage medium. The program product is executed by at least one processor so as to implement the steps of the method according to the first aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the data used in such a way is interchangeable in appropriate circumstances so that the embodiments of this application can be implemented in other orders than the order illustrated or described herein. Moreover, the objects distinguished by "first" and "second" are usually of one type, and the number of objects is not limited. For example, the first object may be one or more than one. In addition, "and/or" in the specification and claims represents at least one of connected objects, and the character "/" generally indicates that the associated objects have an "or" relationship.

It is worth noting that the technology described in the embodiments of this application is not only limited to long term evolution (LTE)/LTE-Advanced (LTE-A) systems, but may also be used in other wireless communications systems such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" in the embodiments of this application are often used interchangeably, the technology described herein may be used in the above-mentioned systems and radio technologies as well as other systems and radio technologies. However, in the following descriptions, a new radio (NR) system is described for illustration purposes, and NR terms are used in most of the following descriptions, although these technologies may also be applied to other applications than the NR system application, for example, $6^{th}$ generation (6G) communications systems.

Figure 1:
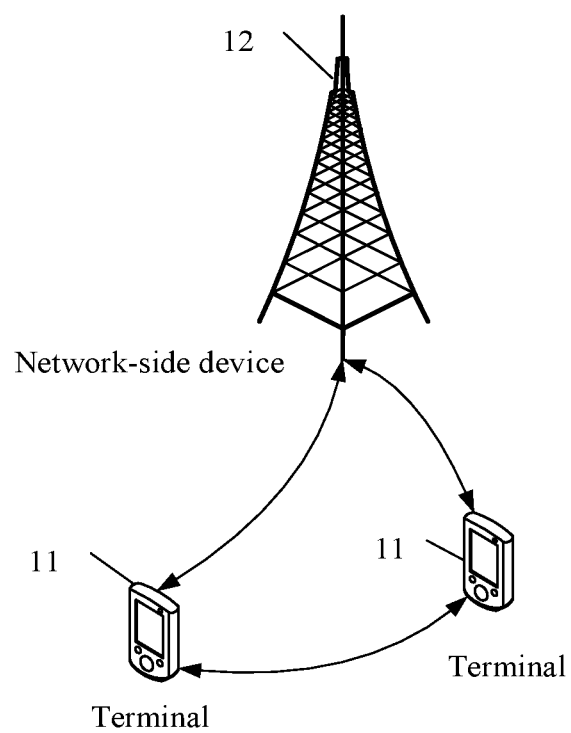
FIG. 1 is a block diagram of a wireless communications system to which embodiments of this application may be applied.

FIG. 1 is a block diagram of a wireless communications system to which the embodiments of this application may be applied. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer or notebook computer, a personal digital assistant (PDA), a handheld computer, a netbook, an ultra-mobile personal computer (UMPC), a mobile internet device (MID), a wearable device, a vehicle-mounted user equipment (VUE), or a pedestrian user equipment (PUE). The wearable device includes a bracelet, a headphone, glasses, and the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, a transmission and reception point (TRP), or some other appropriate term in the art. The base station is not limited to a specific technical term as long as the same technical effect is achieved. It should be noted that the base station in the NR system is taken merely as an example in the embodiments of this application, but a specific type of the base station is not limited.

A brief introduction to NR SL resource allocation/selection is given below.

NR sidelink supports two resource selection modes: one is based on base station scheduling (mode 1), and the other is based on user equipment (UE, also referred to as terminal) autonomous selection (mode 2).

In mode 2, a specific operating procedure is as follows: 1. After triggering resource selection, a transmit terminal (TX UE) determines a resource selection window first. The lower boundary of the resource selection window is at time T1 after the resource selection is triggered, and the upper boundary of the resource selection window is at time T2 after the resource selection is triggered, where T2 is a value selected within a packet delay budget (PDB) for TB transmission by using the UE implementation, and T2 is not earlier than T1. 2. Before resource selection, the UE needs to determine a candidate resource set for the resource selection and perform comparison based on a reference signal received power (RSRP) measured on a resource within the resource selection window and a corresponding RSRP threshold (threshold). In a case that the RSRP is higher than the RSRP threshold, the resource is excluded and cannot be included in the candidate resource set. Resources remaining in the resource selection window after the resource exclusion is performed form the candidate resource set. The resources in the candidate resource set should account for not less than X % (a value of X may be 20, 35, or 50) of resources in the resource selection window. In a case that the resources account for less than X %, the RSRP threshold needs to be increased based on a step value (for example, 3 dB), and then the resource exclusion operation is performed until resources accounting for not less than X % can be selected. (3) After determining the candidate resource set, the UE randomly selects a transmission resource from the candidate resource set. In addition, the UE may reserve, during current transmission, transmission resources for next transmission.

For example, resource selection mode 2 is enhanced in various manners, for example, by using auxiliary information to limit a determining manner of the resource selection window [T1, T2], changing a measured RSRP value or an RSRP threshold value during resource selection, and distinguishing between probabilities of selecting candidate resources inside and outside a resource set. In particular, different candidate resource sets are obtained by using existing resource selection mode 2 and partially enhanced resource selection mode 2.

The following describes in detail the sidelink resource selection method provided in the embodiments of this application through specific embodiments and application scenarios thereof with reference to the accompanying drawings.

Figure 2:
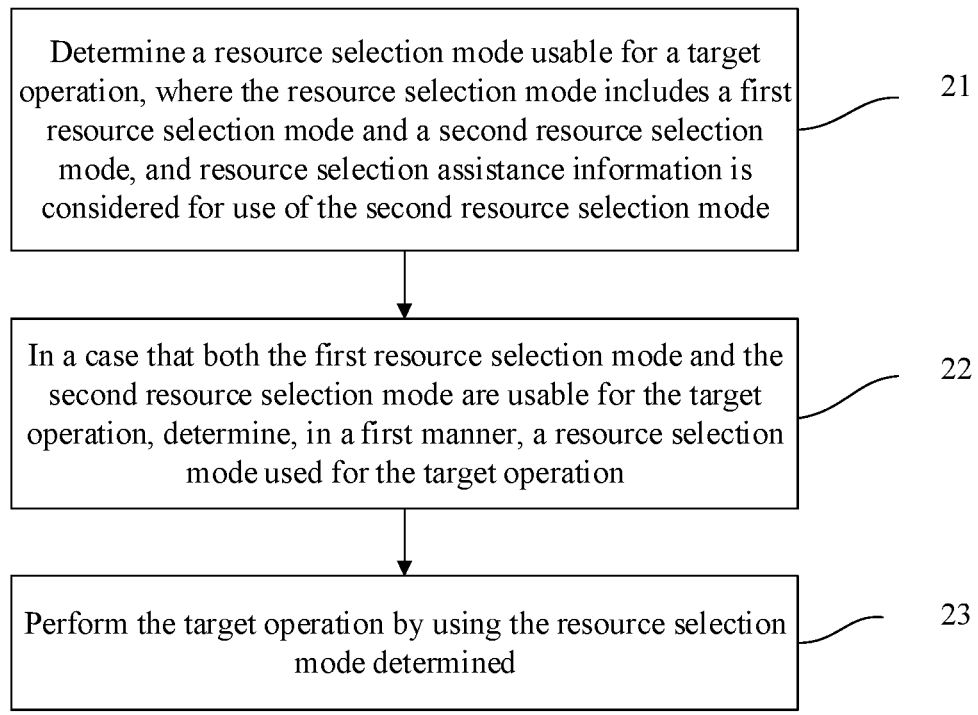
FIG. 2 is a schematic flowchart of a sidelink resource selection method according to an embodiment of this application.

Refer to FIG. 2. An embodiment of this application provides a sidelink resource selection method, applied to a terminal and including the following steps.

Step 21: Determine a resource selection mode usable for a target operation, where the resource selection mode includes a first resource selection mode and a second resource selection mode, and resource selection assistance information is considered for use of the second resource selection mode.

In this embodiment of this application, optionally, the target operation includes at least one of the following:
  initial selection re-evaluation;
  resource preemption detection; and
  resource re-selection.

In this embodiment of this application, the first resource selection mode is a conventional resource selection mode, which is a resource selection mode not requiring consideration of resource selection auxiliary information, and the second resource selection mode is an enhanced resource selection mode. The resource selection assistance information is considered for use of the second resource selection mode.

In this embodiment of this application, optionally, the resource selection assistance information includes at least one of the following: indication information of a recommended resource set, interference of resources, usage of resources, collision of resources, reservation of resources, characteristics of transmission information on resources, and the like. The recommended resource set may include: discontinuous reception (DRX) cycle in time domain, resource set in time domain and/or in frequency domain, and the like. The resource assistance information may be transmitted by another terminal, or may be configured by a control node. Optionally, the another terminal may be a receive terminal (RX UE) or another non-receive terminal.

Step 22: In a case that both the first resource selection mode and the second resource selection mode are usable for the target operation, determine, in a first manner, a resource selection mode used for the target operation.

In this embodiment of this application, optionally, the first manner includes one of the following:
  (1) being content that is specified by a protocol, configured by a control node, pre-configured by a control node, or indicated by another terminal, where
    the control node may be a base station or another terminal; and
  (2) terminal implementation, where
    the terminal implementation means terminal autonomous determining.

In some embodiments of this application, optionally, the content that is configured by the control node or indicated by another terminal includes the resource selection assistance information, and the resource selection assistance information includes at least one of the following: indication information of a recommended resource set, interference of resources, usage of resources, collision of resources, reservation of resources, characteristics of transmission information on resources, and the like. Optionally, the another terminal may be a receive terminal (RX UE) or another non-receive terminal.

In this embodiment of this application, optionally, the resource selection mode used for the target operation that is determined in the first manner includes one of the following:
  the first resource selection mode;
  a mode including at least the first resource selection mode;
  the second resource selection mode;
  a mode including at least the second resource selection mode; and
  the first resource selection mode and the second resource selection mode.

Step 23: Perform the target operation by using the resource selection mode determined.

In this embodiment of this application, it is clarified how a to-be-used resource selection mode is determined for the target operation in a case that both a conventional resource selection mode and an enhanced resource selection mode are usable for the target operation, instead of arbitrarily selecting an existing or enhanced resource selection mode, thereby ensuring transmission reliability.

The sidelink resource selection method in this embodiment of this application is described below with reference to different types of target operations.

(I) The Target Operation is Initial Resource Selection

In this embodiment of this application, the initial resource selection may include at least one of the following:
  initial resource selection and/or re-selection for a TB; and
  initial resource selection and/or re-selection for a sidelink grant (SL grant)/sidelink process (SL process); where
    the re-selection includes re-selection triggered by conditions other than resource selection re-evaluation and resource preemption detection.
  1. Determine whether the second resource selection mode is usable for the initial resource selection.

In this embodiment of this application, one of the following manners may be used for determining whether the second resource selection mode is usable for the initial resource selection.
  (1) Determine, based on whether a preset condition is satisfied, whether the second resource selection mode is usable for the target operation.

Optionally, the preset condition is specified by a protocol, configured by a control node, pre-configured by a control node, or indicated by another terminal.

Optionally, the preset condition includes at least one of the following:

(a) Time domain resource condition

For example, the second resource selection mode is usable in an active period (for example, after a time window/a time point).

The active period may be activated by another terminal, for example, by receiving resource selection assistance information transmitted by the another terminal or by receiving activation indication information transmitted by the another terminal.

(b) Frequency domain resource condition

For example, the second resource selection mode is usable in some carrier frequencies, bandwidth parts (BWP), or resource pools (resource pool).

(c) Characteristic of a to-be-transmitted medium access control protocol data unit (MAC PDU) or transport block In a case that the UE transmits different types of TBs or MAC PDUs, the UE is suitable to use different (conventional/enhanced) resource selection modes for resource selection. Similarly, the UE may be unsuitable to transmit different types of TBs or MAC PDUs on resources reserved by using a single resource selection mode.

For example, the second resource selection mode can be used in a case that quality of service (QoS), priority, latency, and/or reliability of the to-be-transmitted MAC PDUs satisfy preset requirements.

For another example, use of the second resource selection mode for a MAC PDU requires that the MAC PDU has failed to be transmitted x times before, where x is a positive integer greater than or equal to 1.

(d) Transmission type, where the transmission type includes at least one of unicast, groupcast, and broadcast For example, the second resource selection mode is suitable only for unicast and/or groupcast and/or broadcast (broadcast) transmission.

For example, the second resource selection mode can be used in a case that a destination identifier (destination ID) of transmission points to a specific terminal or terminal group (for example, a transmit or receive terminal or terminal group of the auxiliary information).

Different transmission types may be applied to the transmit or receive terminal of the resource selection assistance information. For example, when the receive terminal of the resource selection assistance information performs unicast transmission, the second resource selection mode is used; and when the transmit terminal of the resource selection assistance information performs unicast, groupcast, or broadcast transmission, the second resource selection mode is used.

(e) Capability or type supported by the terminal and/or receive terminal

The capability or type supported by the terminal and/or receive terminal requires support for a second resource management mode. The capability or type supported by the terminal and/or receive terminal is, for example, vehicle UE or pedestrian UE.

(f) State of the terminal and/or the receive terminal being in a coverage area of a specified cell or in a coverage area of a specified sidelink synchronization signal (SLSS)

For example, the base station configures resources of a cell for UE-A, UE-A forwards the resources to UE-B, and UE-B performs transmission based on the resources. In this case, a resource selection mode used for the resources is valid only when UE-B is within a coverage area of the base station/within a coverage area of UE-A.

(2) Determine, based on the terminal implementation, whether the second resource selection mode is usable for the target operation.

The terminal implementation means terminal autonomous determining.

2. Determine a resource selection mode to be used

In this embodiment of this application, optionally, in a case that the second resource selection mode is unusable for the initial resource selection, it is determined that the first resource selection mode is used for the initial resource selection. That the second resource selection mode is unusable for the initial resource selection may be determined based on the foregoing preset condition or may be determined by the terminal.

Optionally, in a case that the preset condition is not satisfied (or whether the preset condition is satisfied cannot be estimated), it is determined that the second resource selection mode is unusable for the initial resource selection.

Optionally, in a case that the preset condition is satisfied, it is determined that the second resource selection mode is usable for the initial resource selection, meaning that both the first resource selection mode and the second resource selection mode are usable for the initial resource selection.

In this embodiment of this application, optionally, in a case that both the first resource selection mode and the second resource selection mode are usable for the initial resource selection, the resource selection mode used for the initial resource selection that is determined in the first manner includes one of the following:

(a) the first resource selection mode;

meaning that only the first resource selection mode is used for resource selection; and (b) the second resource selection mode;

meaning that only the second resource selection mode is used for resource selection.

Optionally, the first manner is one of the following:

(1) being content that is specified by a protocol, configured by a control node, pre-configured by a control node, or indicated by another terminal, where the control node may be a base station or another terminal; and (2) terminal implementation, where the terminal implementation means terminal autonomous determining.

In some embodiments of this application, optionally, the content that is configured by the control node or indicated by another terminal includes the resource selection assistance information, and the resource selection assistance information includes at least one of the following: indication information of a recommended resource set, interference of resources, usage of resources, collision of resources, reservation of resources, characteristics of transmission information on resources, and the like. Optionally, the another terminal may be a receive terminal (RX UE) or another non-receive terminal.

In this embodiment of this application, the resource selection mode used for the initial resource selection is clarified, so as to avoid a problem that transmission reliability of a TB cannot be ensured due to arbitrary use of a conventional (namely, existing)/an enhanced resource selection mode.

(II) The Target Operation is Resource Selection Re-Evaluation or Resource Preemption Detection The following first separately describes the resource selection re-evaluation and the resource preemption detection.

(1) Resource selection re-evaluation

In resource selection mode 2, a resource selection re-evaluation (re-evaluation) mechanism is supported. A brief description of the mechanism is as follows: In order for the UE to determine whether resources (PSCCH/PSSCH resource) selected but unreserved are in an idle state or in a low interference state, the UE performs the resource selection re-evaluation at least at time 'm-T3', where time 'm' is time at which reservation information of the resources is initially transmitted, and T3 includes at least duration for resource selection processing by the UE. The UE performs the steps of resource selection again at least at 'm-T3' to obtain a candidate resource set. In a case that the resources selected by the UE are in the candidate resource set, the UE does not need to perform resource re-selection; otherwise, the UE selects new transmission resources from the candidate resource set.

(2) Resource preemption (Resource pre-emption)

In resource selection mode 2, a resource preemption mechanism is supported. A brief description of the mechanism is as follows: In a case that resources reserved by UE overlap (or partially overlap) with resources reserved or selected by another UE with a higher priority service, when a measured SL-RSRP value of the UE on related resources is greater than an associated SL-RSRP threshold, the UE triggers resource re-selection.

Figure 3:
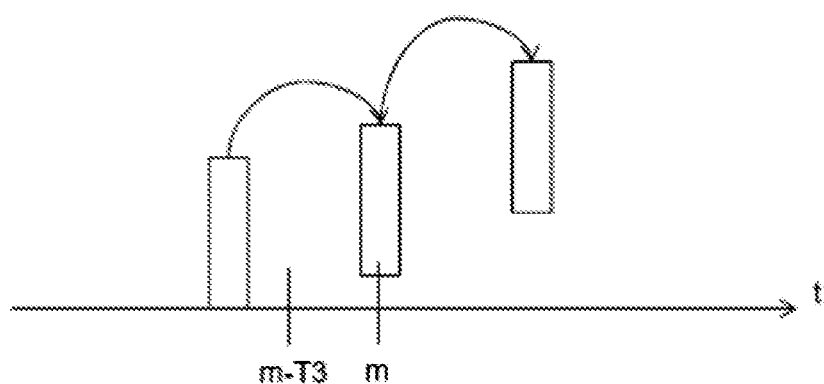
FIG. 3 is a schematic diagram of resource preemption detection.

In order for the UE to determine whether the reserved resources (PSCCH/PSSCH resource) are preempted, referring to FIG. 3, the UE performs preemption detection at least at time 'm-T3', where time 'm' is time at which the resources are located or at which reservation information of the resources is transmitted, and T3 includes at least duration for performing resource selection processing by the UE. The UE performs the steps of resource selection again at least at 'm-T3' to obtain a candidate resource set. In a case that the resources selected by the UE are in the candidate resource set, the UE does not need to perform resource re-selection; otherwise, the UE selects new transmission resources from the candidate resource set.

1. Determine whether the second resource selection mode is usable for the resource selection re-evaluation or the resource preemption detection.

In this embodiment of this application, one of the following manners may be used for determining whether the second resource selection mode is usable for the resource selection re-evaluation or the resource preemption detection.

(1) Determine, based on whether a preset condition is satisfied, whether the second resource selection mode is usable for the resource selection re-evaluation or the resource preemption detection.

Optionally, the preset condition is specified by a protocol, configured by a control node, pre-configured by a control node, or indicated by another terminal.

Optionally, the preset condition includes at least one of the following:

(a) Time domain resource condition

For example, the second resource selection mode is usable in an active period (for example, after a time window/a time point).

The active period may be activated by another terminal, for example, by receiving resource selection assistance information transmitted by the another terminal or by receiving activation indication information transmitted by the another terminal.

(b) Frequency domain resource condition

For example, the second resource selection mode is usable in some carrier frequencies, bandwidth parts (BWP), or resource pools.

(c) Characteristic of a to-be-transmitted medium access control protocol data unit (MAC PDU) or transport block (TB)

In a case that the UE transmits different types of TBs or MAC PDUs, the UE is suitable to use different (conventional/enhanced) resource selection modes for resource selection. Similarly, the UE may be unsuitable to transmit different types of TBs or MAC PDUs on resources reserved by using a single resource selection mode.

For example, the second resource selection mode can be used in a case that quality of service (QoS), priority, latency, and/or reliability of the to-be-transmitted MAC PDUs satisfy preset requirements.

For another example, use of the second resource selection mode for a MAC PDU requires that the MAC PDU has failed to be transmitted x times before, where x is a positive integer greater than or equal to 1.

(d) Transmission type, where the transmission type includes at least one of unicast, groupcast, and broadcast For example, the second resource selection mode is suitable only for unicast and/or groupcast and/or broadcast (broadcast) transmission.

For example, the second resource selection mode can be used in a case that a destination identifier (destination ID) of transmission points to a specific terminal or terminal group (for example, a transmit or receive terminal or terminal group of the auxiliary information).

Different transmission types may be applied to the transmit or receive terminal of the resource selection assistance information. For example, when the receive terminal of the resource selection assistance information performs unicast transmission, the second resource selection mode is used; and when the transmit terminal of the resource selection assistance information performs unicast, groupcast, or broadcast transmission, the second resource selection mode is used.

(e) Capability or type supported by the terminal and/or receive terminal

The capability or type supported by the terminal and/or receive terminal requires support for a second resource management mode. The capability or type supported by the terminal and/or receive terminal is, for example, vehicle UE or pedestrian UE.

(f) State of the terminal and/or the receive terminal being in a coverage area of a specified cell or in a coverage area of a specified sidelink synchronization signal (SLSS)

For example, the base station configures resources of a cell for UE-A, UE-A forwards the resources to UE-B, and UE-B performs transmission based on the resources. In this case, a resource selection mode used for the resources is valid only when UE-B is within a coverage area of the base station/within a coverage area of UE-A.

(2) Determine, based on the terminal implementation, whether the second resource selection mode is usable for the resource selection re-evaluation or the resource preemption detection.

The terminal implementation means terminal autonomous determining.

(3) Determine, based on whether a preset condition and a first pre-determined rule are satisfied, whether the first resource selection mode is usable for the target operation.

Optionally, the first pre-determined rule includes at least one of the following:
- (a) the resource selection re-evaluation or the resource preemption detection uses a same resource selection mode as the initial resource selection; and
- (b) a same resource selection mode is used for multiple sidelink transmission resources of one transport block.

An example of an application scenario of this application is as follows: After the initial resource selection, the second resource selection mode is activated, and in this case, the second resource selection mode does not need to be used for the resource selection re-evaluation, even if the protocol stipulates that the second resource selection mode is used or at least the second resource selection mode is used.

In this embodiment of this application, the initial resource selection may include at least one of the following:
- initial resource selection for a TB; and
- initial resource selection for a sidelink grant (SL grant)/sidelink process (SL process).

2. Determine a resource selection mode
- (1) In this embodiment of this application, optionally, regardless of whether the second resource selection mode is usable for the resource selection re-evaluation or the resource preemption detection, it is determined that the first resource selection mode is used for the resource selection re-evaluation or the resource preemption detection.

That is, it may be directly determined that the first resource selection mode is used for the resource selection re-evaluation or the resource preemption detection without considering the preset condition.

- (2) In this embodiment of this application, optionally, in a case that the second resource selection mode is unusable for the resource selection re-evaluation or the resource preemption detection, it is determined that the first resource selection mode is used or at least the first resource selection mode is used for the resource selection re-evaluation or the resource preemption detection. That the second resource selection mode is unusable for the resource selection re-evaluation or the resource preemption detection may be determined based on the foregoing preset condition or may be determined by the terminal.

Optionally, in a case that the preset condition is not satisfied (or whether the preset condition is satisfied cannot be estimated), it is determined that the second resource selection mode is unusable for the resource selection re-evaluation or the resource preemption detection.

An example in which whether the preset condition is satisfied cannot be estimated includes: when determining whether a periodically reserved resource needs to be preempted, the UE is unable to estimate, in some cases, whether a characteristic of a to-be-transmitted MAC PDU on the resource in the next period satisfies the preset condition.

- (3) In some embodiments of this application, optionally, in a case that both the first resource selection mode and the second resource selection mode are usable for the resource selection re-evaluation or the resource preemption detection, the resource selection mode used for the resource selection re-evaluation or the resource preemption detection that is determined in the first manner includes one of the following:

- (a) the first resource selection mode;
  meaning that only the first resource selection mode is used for resource selection;
- (b) a mode including at least the first resource selection mode;
  meaning that at least the first resource selection mode is used for resource selection, and meaning that the second resource selection mode may be used or may not be used for resource selection;
- (c) the second resource selection mode;
  meaning that only the second resource selection mode is used for resource selection.
- (d) a mode including at least the second resource selection mode;
  meaning that at least the second resource selection mode is used for resource selection, and meaning that the first resource selection mode may be used or may not be used for resource selection; and
- (e) the first resource selection mode and the second resource selection mode;
  meaning that both the first resource selection mode and the second resource selection mode are used for resource selection.

Optionally, the first manner is one of the following:
- (1) protocol specification, configuration by a control node, pre-configuration by a control node, or indication by another terminal, where
  the control node may be a base station or another terminal; and the indication of the another terminal is, for example, a terminal indication for transmitting resource assistance information; and
- (2) terminal implementation, where
  the terminal implementation means terminal autonomous determining.

In some embodiments of this application, optionally, the content that is configured by the control node or indicated by another terminal includes the resource selection assistance information, and the resource selection assistance information includes at least one of the following: indication information of a recommended resource set, interference of resources, usage of resources, collision of resources, reservation of resources, characteristics of transmission information on resources, and the like. Optionally, the another terminal may be a receive terminal (RX UE) or another non-receive terminal.

When the UE performs the resource selection re-evaluation or the resource preemption detection, in a case that a conventional (namely, existing) or an enhanced resource selection mode is arbitrarily used, erroneously determining of the resource re-selection is caused. In this embodiment of this application, the resource selection mode used in the resource selection re-evaluation or resource preemption detection is clarified, so as to avoid erroneously determining of the resource re-selection.

In addition, in a case that the resource selection re-evaluation or the resource preemption detection may be determined by using both conventional (namely, existing) and enhanced resource selection modes, when the UE determines the resource preemption detection or performing the resource selection re-evaluation, there may be at least two different bases for determining whether to perform resource re-selection. In this application, the basis for resource re-selection is clarified to prevent the UE from performing unnecessary resource re-selection, thus avoiding to compromise overall transmission reliability of a system; or to prevent the UE from reselecting resources not in a timely manner when resource re-selection is required, thus avoiding to deteriorate transmission performance of the system/another UE.

3. Trigger of resource re-selection

In some embodiments of this application, optionally, the performing the target operation by using the resource selection mode determined includes: in a case that either the first resource selection mode or the second resource selection mode is used for performing the resource selection re-evaluation or the resource preemption detection, determining, by using the resource selection mode used, whether to trigger resource re-selection. Optionally, in a case that the resources selected are not in the candidate resource set determined by using the resource selection mode used, it is determined to trigger resource re-selection, otherwise, it is determined not to trigger resource re-selection.

In some embodiments of this application, optionally, the performing the target operation by using the resource selection mode determined includes: in a case that both the first resource selection mode and the second resource selection mode are used for performing sidelink resource selection, determining, in one of the following manners, whether to trigger resource re-selection:

(1) Determine, by using the first resource selection mode and the second resource selection mode, whether to trigger resource re-selection.

Optionally, in a case that the resources selected are not in the candidate resource set determined by using the first resource selection mode and the second resource selection mode, it is determined to trigger resource re-selection, otherwise, it is determined not to trigger resource re-selection.

(2) Determine, by using either the first resource selection mode or the second resource selection mode, whether to trigger resource re-selection.

Optionally, in a case that the resources selected are not in the candidate resource set determined by using either the first resource selection mode or the second resource selection mode, it is determined to trigger resource re-selection, otherwise, it is determined not to trigger resource re-selection.

(3) Determine, by using at least one of the first resource selection mode and the second resource selection mode, whether to trigger resource re-selection.

Optionally, in a case that the resources selected are not in the candidate resource set determined by using at least one of the first resource selection mode and the second resource selection mode, it is determined to trigger resource re-selection, otherwise, it is determined not to trigger resource re-selection.

4. Resource re-selection (1) In some embodiments of this application, optionally, after the determining whether to trigger resource re-selection, the method further includes: in a case that either the first resource selection mode or the second resource selection mode is used for performing the target operation and that resource re-selection is triggered, performing resource re-selection in a candidate resource set determined by using the resource selection mode used. Optionally, a resource may be randomly selected from the candidate resource set.

(2) In some embodiments of this application, optionally, after the determining whether to trigger resource re-selection, the method further includes: in a case that both the first resource selection mode and the second resource selection mode are used for performing the target operation and that the first resource selection mode and the second resource selection mode both trigger resource re-selection, determining, in a second manner, a target candidate resource set used for resource re-selection.

Optionally, the second manner includes one of the following:

(a) being specified by a protocol, being configured by a control node, being pre-configured by a control node, or being indicated by another terminal;

(b) being implemented by the terminal; and (c) using a second pre-determined rule.

Optionally, the second pre-determined rule includes: using a candidate resource set, from which sidelink transmission resources that meet a HARQ RTT condition are able to be selected, as the target candidate resource set.

The HARQ RTT condition is briefly described below.

At least for mode 2, to ensure that PSSCH retransmission resources are usable after the TX UE demodulates feedback information, it is stipulated that a time gap between PSSCH transmission resources selected at any two times needs to be greater than a hybrid automatic repeat request round-trip time (HARQ RTT) time (that is, the following Z=a+b is the HARQ RTT time). a is a time gap between the end of the last symbol of a first resource for PSSCH (shared channel) transmission and the beginning of the first symbol for corresponding PSFCH (feedback channel) reception, and is determined by a resource pool configuration and higher layer parameters of MinTimeGapPSFCH and period-PSFCHresource. b is duration required for preparation for PSFCH reception and processing/sidelink retransmission, including multiplexing of necessary physical channels and any TX-RX/RX-TX switching time, and is determined by the UE implementation.

Figure 4:
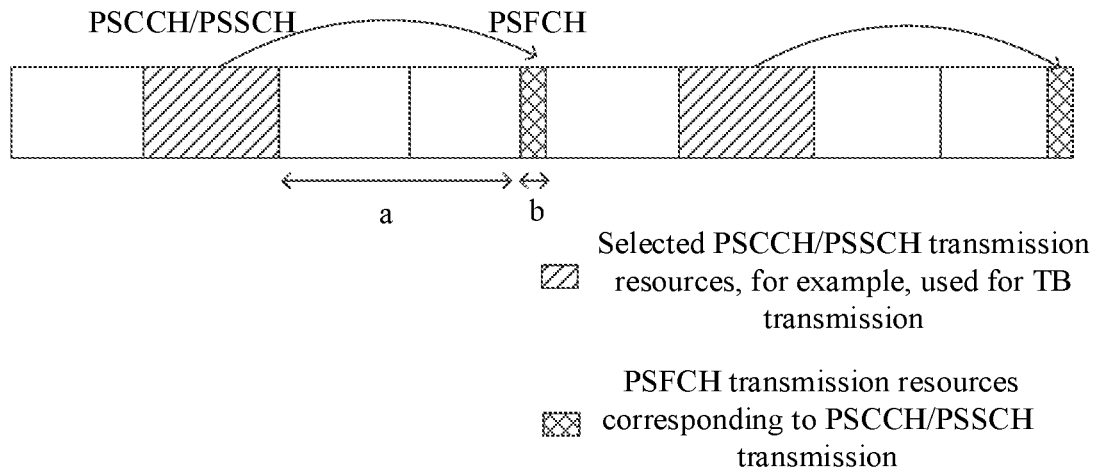
FIG. 4 is a schematic diagram of HARQ RTT time requirements.

FIG. 4 is a schematic diagram of a and b. In FIG. 4, a value of b is smaller, and the preparation for PSFCH reception and processing/retransmission can be completed within a slot (slot) in which a physical sidelink feedback channel (PSFCH) is located, indicating that a first PSCCH/PSSCH resource and a second PSCCH/PSSCH resource satisfy HARQ RTT time requirements.

Optionally, the target candidate resource set determined is one of the following:

(a) a candidate resource set determined by using the first resource selection mode;

(b) a candidate resource set determined by using the second resource selection mode; and (c) a candidate resource set determined by using the first resource selection mode and the second resource selection mode.

Optionally, a resource may be randomly selected from the target candidate resource set.

(3) In some embodiments of this application, optionally, in a case that both the first resource selection mode and the second resource selection mode are used for performing sidelink resource selection and that either the first resource selection mode or the second resource selection mode triggers resource re-selection, a target candidate resource set is determined based on the candidate resource set determined by using the first resource selection mode and the second resource selection mode.

Optionally, in a case that the target candidate resource set is determined by using the first resource selection mode and the second resource selection mode, the target candidate resource set is an intersection or a union of candidate resource sets determined by using the first resource selection mode and the second resource selection mode.

Optionally, a resource may be randomly selected from the candidate resource set.

In some embodiments of this application, optionally, in a case that the resource selection re-evaluation or the resource preemption detection is performed by using the second resource selection mode, signaling is transmitted to a receive terminal to trigger the receive terminal to report the resource selection assistance information, where the resource selection assistance information includes at least one of the following: indication information of a recommended resource set, interference of resources, usage of resources, collision of resources, reservation of resources, characteristics of transmission information on resources, and the like.

(III) The Target Operation is Resource Re-Selection

In some embodiments of this application, optionally, in a case that sidelink transmission resources reserved by the terminal are not in a recommended resource set, it is determined to trigger resource re-selection; or in a case that sidelink transmission resources reserved by the terminal are in a recommended resource set, it is determined to trigger resource re-selection.

For example, the UE uses the first resource selection mode when performing resource selection and performs resource reservation for selected resources. When transmitting a new TB, the UE may need to use the second resource selection mode. In this case, the reserved resources may no longer be suitable for the new TB transmission, and therefore resource re-selection needs to be triggered.

The reservation is periodic reservation and/or aperiodic reservation.

In NR SL, the transmit terminal (TX UE) performs resource reservation (the reservation includes periodic reservation and aperiodic reservation) for the resources selected by the transmit terminal, and the reserved resources are used for future physical sidelink control channel (PSCCH) transmission or physical sidelink shared channel (PSSCH) transmission.

The aperiodic reservation may be implemented through a time domain resource assignment field in sidelink control information (SCI), and the reserved resources may be used at least for transmission of a same TB.

The periodic reservation may be implemented through a resource reservation period field in the SCI, and the periodic resources reserved in a current period may be used for transmission of a next TB.

The following describes, with examples, the method provided in this application with reference to specific embodiments.

Embodiment 1

In an embodiment, in a case that the resource selection assistance information received by the TX UE can reflect interference of resources detected by the RX UE, the TX UE can use the second resource selection mode, but the TX UE is not required to use the second resource selection mode.

In another embodiment, in a case that resource set indication information received by the TX UE reflects a reception time period of the RX UE, the TX UE needs to use the second resource selection mode.

Embodiment 2

1. The UE determines, based on content of resource selection assistance information received from another UE (where the resource selection assistance information may include interference of resources and/or indication information of a recommended resource set), a resource selection mode used for the target operation.

For example, in a case that at least one of the following conditions (1) to (4) is satisfied, it is determined that the resource selection mode used for the target operation is: 1 the first resource selection mode; or a mode including at least the first resource selection mode; or the second resource selection mode; or a mode including at least the second resource selection mode; or the first resource selection mode and the second resource selection mode.

(1) The resource selection assistance information received reflects interference of resources detected by the another UE.

(2) The received indication information of the recommended resource set reflects a resource selection tendency of the UE and/or the another UE, for example:

(a) preferentially selecting resources in the resource set (for example, the UE preferentially selects the resources in the resource set in the second resource selection mode); and (b) selecting only resources or no resources in the resource set (for example, the UE selects only resources or no resources in the resource set in the second resource selection mode).

(3) The received indication information of the recommended resource set reflects a resource usage (for example, using resources for information transmission) tendency of a UE group to which the UE belongs.

This scenario is a scenario in which one UE transmits resource selection assistance information to a UE group or some UEs in a UE group.

(4) The received indication information of the recommended resource set reflects a reception time period of the another UE, for example, a DRX ON period.

2. The UE determines, based on content of resource selection assistance information transmitted by the UE (where the resource selection assistance information may include interference of resources and/or indication information of a recommended resource set), a resource selection mode used for the target operation.

For example, in a case that at least one of the following conditions (1) to (4) is satisfied, it is determined that the resource selection mode used for the target operation is: 1 the first resource selection mode; or a mode including at least the first resource selection mode; or the second resource selection mode; or a mode including at least the second resource selection mode; or the first resource selection mode and the second resource selection mode.

(1) The resource selection assistance information transmitted reflects interference of resources detected by the UE.

(2) The transmitted indication information of the recommended resource set reflects a resource selection tendency of the UE and/or the another UE, for example:

(a) preferentially selecting resources in the resource set (for example, the UE preferentially selects the resources in the resource set in the second resource selection mode); and (b) selecting only resources or no resources in the resource set (for example, the UE selects only resources or no resources in the resource set in the second resource selection mode).

(3) The transmitted indication information of the recommended resource set reflects a resource usage (for example, using resources for information transmission) tendency of a UE group to which the UE belongs.

This scenario is a scenario in which one UE transmits resource selection assistance information to a UE group or some UEs in a UE group.

(4) The transmitted indication information of the recommended resource set reflects a reception time period of the another UE, for example, a DRX ON period.

Embodiment 3

In an embodiment, the TX UE receives indication information of a recommended resource set from the RX UE, indicating that the RX UE can performing reception only on specific resources (for example, a DRX ON period). The TX UE needs to transmit a TB or MAC PDU to the RX UE. Before this transmission, the TX UE transmits information (for example, broadcast transmission) and reserves resources. For this transmission, in a case that the TX UE determines that the reserved resources are not in the resource set recommended by the RX UE, the TX UE needs to perform resource re-selection.

In another embodiment, the TX UE receives indication information of a recommended resource set from the RX UE, indicating that the RX UE can performing reception only on specific resources (for example, a DRX ON period). The TX UE needs to transmit a TB or MAC PDU to the RX UE. During TB retransmission, the TX UE receives indication information of a recommended resource set changed by the RX UE, and in a case that the resources reserved for this TB transmission are not in the new recommended resource set, the TX UE performs resource re-selection.

In this embodiment of this application, it is clarified how a to-be-used resource selection mode is determined for the target operation in a case that both a conventional resource selection mode and an enhanced resource selection mode are usable for the target operation, instead of arbitrarily selecting an existing or enhanced resource selection mode. This avoids unnecessary resource selection or erroneously determining of resource re-selection, thereby ensuring transmission reliability. In addition, triggering conditions for resource re-selection are clarified so as to ensure that the terminal selects appropriate transmission resources, raising reliability and effectiveness of transmission.

It should be noted that the sidelink resource selection method provided in this embodiment of this application may be performed by a sidelink resource selection apparatus, or a control module, for performing the sidelink resource selection method, in the sidelink resource selection apparatus. In this embodiment of this application, the sidelink resource selection method performed by a sidelink resource selection apparatus is used as an example to describe the sidelink resource selection apparatus provided in the embodiments of this application.

Figure 5:
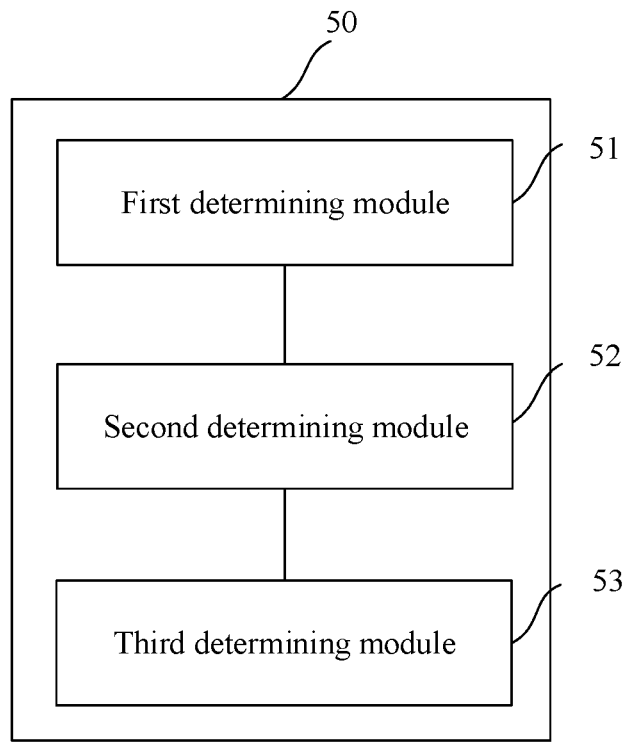
FIG. 5 is a structural block diagram of a sidelink resource selection apparatus according to an embodiment of this application.

Refer to FIG. 5. An embodiment of this application provides a sidelink resource selection apparatus 50, including:

a first determining module 51, configured to determine a resource selection mode usable for a target operation, where the resource selection mode includes a first resource selection mode and a second resource selection mode, and resource selection assistance information is considered for use of the second resource selection mode;

a second determining module 52, configured to: in a case that both the first resource selection mode and the second resource selection mode are usable for the target operation, determine, in a first manner, a resource selection mode used for the target operation; and a third determining module 53, configured to perform the target operation by using the resource selection mode determined.

Optionally, the first manner includes one of the following:

being content that is specified by a protocol, configured by a control node, pre-configured by a control node, or indicated by another terminal; and being implemented by the terminal.

Optionally, the content that is configured by the control node or indicated by another terminal includes the resource selection assistance information.

Optionally, the resource selection mode used for the target operation that is determined in the first manner includes one of the following:

the first resource selection mode;

a mode including at least the first resource selection mode;

the second resource selection mode;

a mode including at least the second resource selection mode; and the first resource selection mode and the second resource selection mode.

Optionally, the target operation includes at least one of the following:

initial resource selection;

resource selection re-evaluation;

resource preemption detection; and resource re-selection.

Optionally, the first determining module is configured to determine whether the second resource selection mode is usable for the target operation.

Optionally, the first determining module includes one of the following:

a first determining sub-module, configured to determine, based on whether a preset condition is satisfied, whether the second resource selection mode is usable for the target operation;

a second determining sub-module, configured to determine, based on the terminal implementation, whether the second resource selection mode is usable for the target operation; and a third determining sub-module, configured to determine, based on whether a preset condition and a first pre-determined rule are satisfied, whether the second resource selection mode is usable for the target operation.

Optionally, the preset condition is specified by a protocol, configured by a control node, pre-configured by a control node, or indicated by another terminal.

Optionally, the preset condition includes at least one of the following:

time domain resource condition;

frequency domain resource condition;

characteristic of a to-be-transmitted MAC PDU or transport block;

transmission type, where the transmission type includes at least one of unicast, groupcast, and broadcast;

capability or type supported by the terminal and/or a receive terminal; and state of the terminal and/or the receive terminal being in a coverage area of a specified cell or in a coverage area of a specified sidelink synchronization signal.

Optionally, the target operation is resource selection re-evaluation or resource preemption detection, and the first pre-determined rule includes at least one of the following:

the resource selection re-evaluation or the resource preemption detection uses a same resource selection mode as the initial resource selection; or a same resource selection mode is used for multiple sidelink transmission resources of one transport block.

Optionally, the third determining module is configured to: in a case that either the first resource selection mode or the second resource selection mode is used for performing the target operation, determine, by using the resource selection mode used, whether to trigger resource re-selection.

Optionally, the third determining module is configured to: in a case that both the first resource selection mode and the second resource selection mode are used for performing the target operation, determine, by using the first resource selection mode and the second resource selection mode, whether to trigger resource re-selection; or the third determining module is configured to: in a case that both the first resource selection mode and the second resource selection mode are used for performing the target operation, determine, by using either the first resource selection mode or the second resource selection mode, whether to trigger resource re-selection; or the third determining module is configured to: in a case that both the first resource selection mode and the second resource selection mode are used for performing the target operation, determine, by using at least one of the first resource selection mode and the second resource selection mode, whether to trigger resource re-selection.

Optionally, the sidelink resource selection apparatus further includes:

a fourth determining module, configured to: in a case that either the first resource selection mode or the second resource selection mode is used for performing the target operation and that resource re-selection is triggered, perform resource re-selection in a candidate resource set determined by using the resource selection mode used.

Optionally, the sidelink resource selection apparatus further includes:

a fifth determining module, configured to: in a case that both the first resource selection mode and the second resource selection mode are used for performing the target operation and that the first resource selection mode and the second resource selection mode both trigger resource re-selection, determine, in a second manner, a target candidate resource set used for resource re-selection.

Optionally, the second manner includes one of the following:

being specified by a protocol, being configured by a control node, being pre-configured by a control node, or being indicated by another terminal;

being implemented by the terminal; and using a second pre-determined rule.

Optionally, the second pre-determined rule includes: using a candidate resource set, from which sidelink transmission resources that meet a HARQ RTT condition are able to be selected, as the target candidate resource set.

Optionally, the target candidate resource set is one of the following:

a candidate resource set determined by using the first resource selection mode;

a candidate resource set determined by using the second resource selection mode; and a candidate resource set determined by using the first resource selection mode and the second resource selection mode.

Optionally, the sidelink resource selection apparatus further includes:

a sixth determining module, configured to: in a case that both the first resource selection mode and the second resource selection mode are used for performing the target operation and that either the first resource selection mode or the second resource selection mode triggers resource re-selection, determine a target candidate resource set based on the candidate resource set determined by using the first resource selection mode and the second resource selection mode.

Optionally, in a case that the target candidate resource set is determined by using the first resource selection mode and the second resource selection mode, the target candidate resource set is an intersection or a union of candidate resource sets determined by using the first resource selection mode and the second resource selection mode.

Optionally, the sidelink resource selection apparatus further includes:

a transmitting module, configured to: in a case that the second resource selection mode is used for performing the target operation, transmit signaling to a receive terminal so as to trigger the receive terminal to report the resource selection assistance information.

Optionally, in a case that the target operation is resource re-selection, the sidelink resource selection apparatus further includes:

a seventh determining module, configured to: in a case that sidelink transmission resources reserved by the terminal are not in a recommended resource set, determine to trigger resource re-selection; or an eighth determining module, configured to: in a case that sidelink transmission resources reserved by the terminal are in a recommended resource set, determine to trigger resource re-selection.

The sidelink resource selection apparatus in this embodiment of this application may be an apparatus, or may be a component, an integrated circuit, or a chip in the terminal. The apparatus may be a mobile terminal or a non-mobile terminal. For example, the mobile terminal may include but is not limited to the types of terminals 11 listed above, and the non-mobile terminal may be a server, a network attached storage (NAS), a personal computer (PC), a television (television, TV), an automated teller machine, a self-service machine or the like, which are not specifically limited in the embodiments of this application.

The sidelink resource selection apparatus in this embodiment of this application may be an apparatus having an operating system. The operating system may be an Android operating system, may be an iOS operating system, or may be another possible operating system. This is not specifically limited in the embodiments of this application.

The sidelink resource selection apparatus provided in this embodiment of this application can implement the processes implemented by the method embodiment in FIG. 2, with the same technical effects achieved. To avoid repetition, details are not described herein again.

Figure 6:
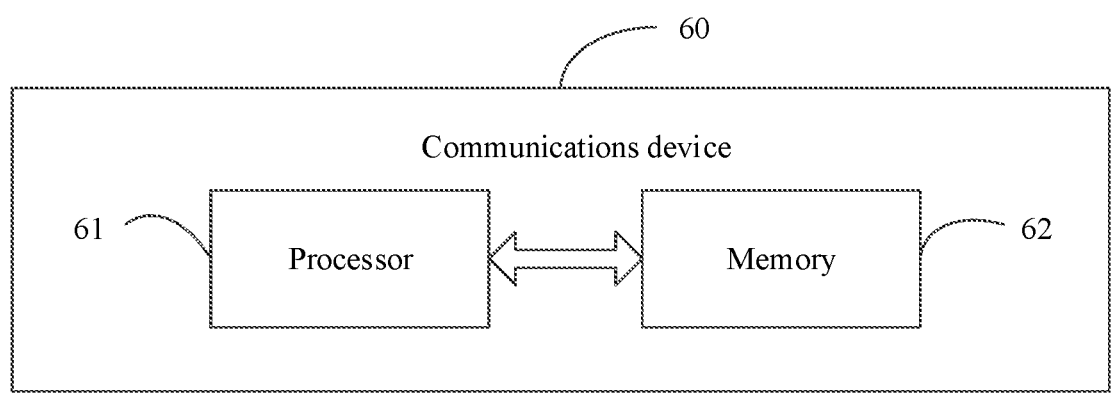
FIG. 6 is a schematic structural diagram of a terminal according to an embodiment of this application.

As shown in FIG. 6, an embodiment of this application further provides a terminal 60, including a processor 61, a memory 62, and a program or instructions stored in the memory 62 and capable of running on the processor 61, where when the program or instructions are executed by the processor 61, the processes of the foregoing sidelink resource selection method embodiment are implemented, with the same technical effects achieved. To avoid repetition, details are not further described herein.

Figure 7:
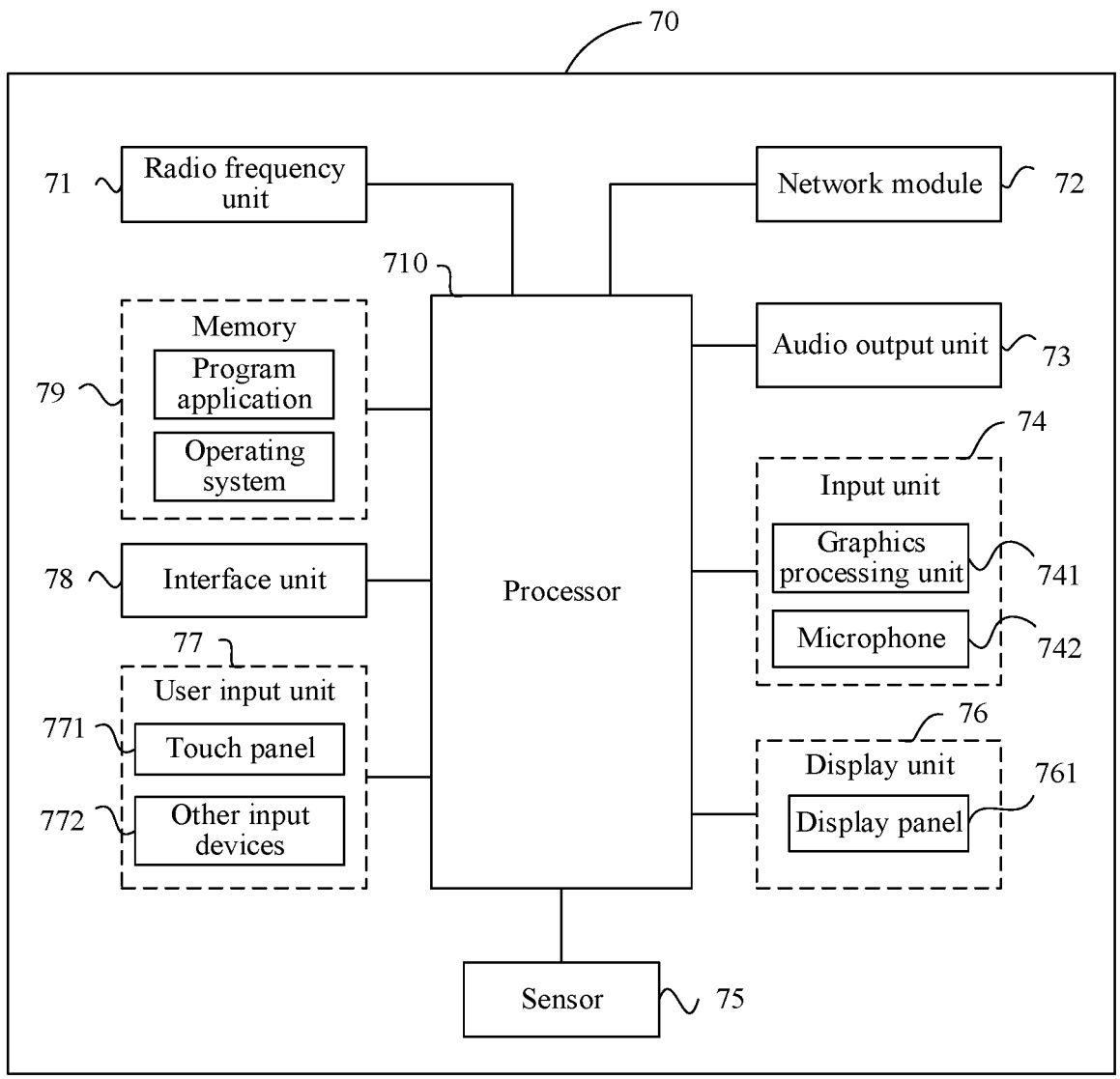
FIG. 7 is a schematic diagram of a hardware structure of a terminal according to an embodiment of this application.

FIG. 7 is a schematic diagram of a hardware structure of a terminal for implementing the embodiments of this application. The terminal 70 includes but is not limited to components such as a radio frequency unit 71, a network module 72, an audio output unit 73, an input unit 74, a sensor 75, a display unit 76, a user input unit 77, an interface unit 78, a memory 79, and a processor 710.

It can be understood by those skilled in the art that the terminal 70 may further include the power supply (for example, a battery) supplying power to the components. The power supply may be logically connected to the processor 710 via a power management system, so that functions such as charge and discharge management and power consumption management are implemented via the power management system. The structure of the terminal shown in FIG. 7 does not constitute any limitation on the terminal, and the terminal may include more or fewer components than shown in the diagram, or combine some of the components, or have different arrangements of the components. Details are not described herein.

It should be understood that, in this embodiment of this application, the input unit 74 may include a graphics processing unit (GPU) 741 and a microphone 742. The graphics processing unit 741 processes image data of a static picture or a video that is obtained by an image capture apparatus (for example, a camera) in a video capture mode or an image capture mode. The display unit 76 may include the display panel 761. The display panel 761 may be configured in a form of a liquid crystal display, an organic light-emitting diode, or the like. The user input unit 77 includes a touch panel 771 and other input devices 772. The touch panel 771 is also referred to as a touchscreen. The touch panel 771 may include two parts: a touch detection apparatus and a touch controller. The other input devices 772 may include but are not limited to a physical keyboard, a function button (for example, a volume control button or a power on/off button), a trackball, a mouse, and a joystick. Details are not described herein.

In this embodiment of this application, the radio frequency unit 71 transmits downlink data received from a network-side device to the processor 710 for processing, and in addition, transmits uplink data to the network-side device. Generally, the radio frequency unit 71 includes but is not limited to, an antenna, at least one amplifier, a transceiver, a coupler, a low noise amplifier, a duplexer, and the like.

The memory 79 may be configured to store software programs or instructions and various data. The memory 79 may mainly include a program or instruction storage area and a data storage area. The program or instruction storage area may store an operating system, an application program or instructions required for at least one function (for example, a sound play function and a image play function), and the like. Further, the memory 79 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The memory 79 may be, for example, at least one magnetic disk storage device, flash memory, or other volatile solid-state storage device.

The processor 710 may include one or more processing units. Optionally, the processor 710 may integrate an application processor and a modem processor. The application processor mainly processes an operating system, a user interface, an application program or instructions, and the like. The modem processor, such as a baseband processor, mainly processes wireless communication. It can be understood that the modem processor may alternatively be not integrated in the processor 710.

The processor 710 is configured to: determine a resource selection mode usable for a target operation, where the resource selection mode includes a first resource selection mode and a second resource selection mode, and resource selection assistance information is considered for use of the second resource selection mode; in a case that both the first resource selection mode and the second resource selection mode are usable for the target operation, determine, in a first manner, a resource selection mode used for the target operation; and perform the target operation by using the resource selection mode determined.

Optionally, the first manner includes one of the following:
being content that is specified by a protocol, configured by a control node, pre-configured by a control node, or indicated by another terminal; and
being implemented by the terminal.

Optionally, the content that is configured by the control node or indicated by another terminal includes the resource selection assistance information.

Optionally, the resource selection mode used for the target operation that is determined in the first manner includes one of the following:
the first resource selection mode;
a mode including at least the first resource selection mode;
the second resource selection mode;
a mode including at least the second resource selection mode; and
the first resource selection mode and the second resource selection mode.

Optionally, the target operation includes at least one of the following:
initial resource selection;
resource selection re-evaluation;
resource preemption detection; and
resource re-selection.

Optionally, the processor 710 is configured to determine whether the second resource selection mode is usable for the target operation.

Optionally, the processor 710 is configured to determine, based on whether a preset condition is met, whether the second resource selection mode is usable for the target operation; or determine, based on terminal implementation, whether the second resource selection mode is usable for the target operation; or determine, based on whether a preset condition and a first pre-determined rule are satisfied, whether the second resource selection mode is usable for the target operation.

Optionally, the preset condition is specified by a protocol, configured by a control node, pre-configured by a control node, or indicated by another terminal.

Optionally, the preset condition includes at least one of the following:
time domain resource condition;
frequency domain resource condition;
characteristic of a to-be-transmitted MAC PDU or transport block;
transmission type, where the transmission type includes at least one of unicast, groupcast, and broadcast;
capability or type supported by the terminal and/or a receive terminal; and state of the terminal and/or the receive terminal being in a coverage area of a specified cell or in a coverage area of a specified sidelink synchronization signal.

Optionally, the target operation is resource selection re-evaluation or resource preemption detection, and the first pre-determined rule includes at least one of the following:
the resource selection re-evaluation or the resource preemption detection uses a same resource selection mode as the initial resource selection; or
a same resource selection mode is used for multiple sidelink transmission resources of one transport block.

Optionally, the processor 710 is configured to: in a case that either the first resource selection mode or the second resource selection mode is used for performing the target operation, determine, by using the resource selection mode used, whether to trigger resource re-selection.

Optionally, the processor 710 is configured to: in a case that both the first resource selection mode and the second resource selection mode are used for performing the target operation, determine, by using the first resource selection mode and the second resource selection mode, whether to trigger resource re-selection; or
in a case that both the first resource selection mode and the second resource selection mode are used for performing the target operation, determine, by using either the first resource selection mode or the second resource selection mode, whether to trigger resource re-selection; or
in a case that both the first resource selection mode and the second resource selection mode are used for performing the target operation, determine, by using at least one of the first resource selection mode and the second resource selection mode, whether to trigger resource re-selection.

Optionally, the processor 710 is configured to: in a case that either the first resource selection mode or the second resource selection mode is used for performing the target operation and that resource re-selection is triggered, perform resource re-selection in a candidate resource set determined by using the resource selection mode used.

Optionally, the processor 710 is configured to: in a case that both the first resource selection mode and the second resource selection mode are used for performing the target operation and that the first resource selection mode and the second resource selection mode both trigger resource re-selection, determine, in a second manner, a target candidate resource set used for resource re-selection.

Optionally, the second manner includes one of the following:
being specified by a protocol, being configured by a control node, being pre-configured by a control node, or being indicated by another terminal;
being implemented by the terminal; and
using a second pre-determined rule.

Optionally, the second pre-determined rule includes: using a candidate resource set, from which sidelink transmission resources that meet a HARQ RTT condition are able to be selected, as the target candidate resource set.

Optionally, the target candidate resource set is one of the following:
a candidate resource set determined by using the first resource selection mode;
a candidate resource set determined by using the second resource selection mode; and
a candidate resource set determined by using the first resource selection mode and the second resource selection mode.

Optionally, the processor 710 is configured to: in a case that both the first resource selection mode and the second resource selection mode are used for performing the target operation and that either the first resource selection mode or the second resource selection mode triggers resource re-selection, determine a target candidate resource set based on the candidate resource set determined by using the first resource selection mode and the second resource selection mode.

Optionally, in a case that the target candidate resource set is determined by using the first resource selection mode and the second resource selection mode, the target candidate resource set is an intersection or a union of candidate resource sets determined by using the first resource selection mode and the second resource selection mode.

Optionally, the processor 710 is configured to: in a case that the second resource selection mode is used for performing the target operation, transmit signaling to a receive terminal so as to trigger the receive terminal to report the resource selection assistance information.

Optionally, in a case that the target operation is resource re-selection, the processor 710 is configured to: in a case that sidelink transmission resources reserved by the terminal are not in a recommended resource set, determine to trigger resource re-selection; or in a case that sidelink transmission resources reserved by the terminal are in a recommended resource set, determine to trigger resource re-selection.

In this embodiment of this application, it is clarified how a to-be-used resource selection mode is determined for the target operation in a case that both a conventional resource selection mode and an enhanced resource selection mode are usable for the target operation, instead of arbitrarily selecting an existing or enhanced resource selection mode. This avoids unnecessary resource selection or erroneously determining of resource re-selection, thereby ensuring transmission reliability. In addition, triggering conditions for resource re-selection are clarified so as to ensure that the terminal selects appropriate transmission resources, raising reliability and effectiveness of transmission.

An embodiment of this application further provide a readable storage medium, where the readable storage medium stores a program or instructions, and when the program or instructions are executed by a processor, the processes of the foregoing sidelink resource selection method embodiments are implemented, with the same technical effect achieved. To avoid repetition, details are not described herein again.

The processor is the processor in the terminal described in the foregoing embodiment. The readable storage medium includes a computer-readable storage medium, such as a computer read-only memory (ROM), a random access memory (RAM), a magnetic disk, or an optical disc.

An embodiment of this application further provides a chip, where the chip includes a processor and a communications interface, the communications interface is coupled to the processor, and the processor is configured to run a program or instructions on a network-side device to implement the processes of the foregoing sidelink resource selection method embodiment, with the same technical effects achieved. To avoid repetition, details are not described herein again.

It should be understood that the chip in the embodiments of this application may also be referred to as a system-level chip, a system chip, a chip system, a system on chip, or the like.

An embodiment of this application further provide a program product, where the program product is stored in a non-volatile storage medium, and when the program product is executed by at least one processor so as to implement the processes of the foregoing sidelink resource selection method embodiment, with the same technical effects achieved. To avoid repetition, details are not described herein again.

It may be understood that the embodiments described in this disclosure may be implemented by hardware, software, firmware, middleware, microcode, or a combination thereof. For hardware implementation, a module, a unit, a sub-module, a sub-unit, or the like may be implemented in one or more application-specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this application, or a combination thereof.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the description of the foregoing embodiments, persons skilled in the art can clearly understand that the method in the foregoing embodiments may be implemented by software in addition to a necessary universal hardware platform or by hardware only. In most cases, the former is a preferred implementation. Based on such an understanding, the technical solutions of this application essentially, or the part contributing to the prior art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to these specific embodiments. The specific embodiments are merely illustrative rather than restrictive. Inspired by this application, persons of ordinary skill in the art may develop many other manners without departing from the principle of this application and the protection scope of the claims, and all such manners fall within the protection scope of this application.

What is claimed is:

1. A sidelink resource selection method performed by a terminal, comprising:
   determining a resource selection mode usable for a target operation, wherein the resource selection mode comprises a first resource selection mode and a second resource selection mode, wherein resource selection assistance information is not considered in the first resource selection mode and the resource selection assistance information is considered in the second resource selection mode;
   in a case that both the first resource selection mode and the second resource selection mode are usable for the target operation, determining a resource selection mode used for the target operation based on specification of a protocol, or configuration of a control node, or pre-configuration of a control node, or a content indicated by another terminal, or by implementation of the terminal; and
   performing the target operation by using the resource selection mode determined;
   wherein determining the resource selection mode used for the target operation based on the content indicated by another terminal comprises:
   determining the resource selection mode used for the target operation, according to content of resource selection assistance information received from a receiving terminal, wherein the resource selection assistance information comprises indication information of a recommended resource set; if the indication information of the recommended resource set indicates a reception time period of the receiving terminal, the resource selection mode used for the target operation is the second resource selection mode.

2. The method according to claim 1, wherein the content that is configured by the control node or indicated by another terminal comprises the resource selection assistance information.

3. The method according to claim 1, wherein the resource selection mode used for the target operation that is determined based on the specification of the protocol, or configuration of the control node, or pre-configuration of the control node, or the content indicated by another terminal, or by the terminal comprises one of the following:
   the first resource selection mode;
   a mode comprising at least the first resource selection mode;
   the second resource selection mode;
   a mode comprising at least the second resource selection mode; and
   the first resource selection mode and the second resource selection mode.

4. The method according to claim 1, wherein the target operation comprises at least one of the following:
   initial resource selection;
   resource selection re-evaluation;
   resource preemption detection; or
   resource re-selection.

5. The method according to claim 4, wherein the determining a resource selection mode usable for a target operation comprises:
   determining whether the second resource selection mode is usable for the target operation.

6. The method according to claim 5, wherein the determining whether the second resource selection mode is usable for the target operation comprises one of the following:

determining, based on whether a preset condition is satisfied, whether the second resource selection mode is usable for the target operation;

determining, based on the terminal implementation, whether the second resource selection mode is usable for the target operation; and determining, based on whether a preset condition and a first pre-determined rule are satisfied, whether the second resource selection mode is usable for the target operation.

7. The method according to claim 6, wherein the preset condition comprises at least one of the following:

time domain resource condition;

frequency domain resource condition;

characteristic of a to-be-transmitted medium access control protocol data unit MAC PDU or transport block;

transmission type, wherein the transmission type comprises at least one of unicast, groupcast, or broadcast;

capability or type supported by the terminal and/or a receive terminal; or state of the terminal and/or the receive terminal being in a coverage area of a specified cell or in a coverage area of a specified sidelink synchronization signal.

8. The method according to claim 6, wherein the target operation is resource selection re-evaluation or resource preemption detection, and the first pre-determined rule comprises at least one of the following:

the resource selection re-evaluation or the resource preemption detection uses a same resource selection mode as the initial resource selection; or a same resource selection mode is used for multiple sidelink transmission resources of one transport block.

9. The method according to claim 4, wherein the performing the target operation by using the resource selection mode determined comprises:

in a case that either the first resource selection mode or the second resource selection mode is used for performing the target operation, determining, by using the resource selection mode used, whether to trigger resource re-selection.

10. The method according to claim 9, wherein after the determining whether to trigger resource re-selection, the method further comprises:

in a case that either the first resource selection mode or the second resource selection mode is used for performing the target operation and that resource re-selection is triggered, performing resource re-selection in a candidate resource set determined by using the resource selection mode used.

11. The method according to claim 4, wherein the performing the target operation by using the resource selection mode determined comprises:

in a case that both the first resource selection mode and the second resource selection mode are used for performing the target operation, determining, by using the first resource selection mode and the second resource selection mode, whether to trigger resource re-selection; or in a case that both the first resource selection mode and the second resource selection mode are used for performing the target operation, determining, by using either the first resource selection mode or the second resource selection mode, whether to trigger resource re-selection; or in a case that both the first resource selection mode and the second resource selection mode are used for performing the target operation, determining, by using at least one of the first resource selection mode or the second resource selection mode, whether to trigger resource re-selection.

12. The method according to claim 11, wherein after the determining whether to trigger resource re-selection, the method further comprises:

in a case that both the first resource selection mode and the second resource selection mode are used for performing the target operation and that the first resource selection mode and the second resource selection mode both trigger resource re-selection, determining a target candidate resource set used for resource re-selection based on specification of the protocol, or configuration of the control node, or pre-configuration of the control node, or the content indicated by another terminal, or by implementation of the terminal or a second pre-determined rule.

13. The method according to claim 11, wherein after the determining whether to trigger resource re-selection, the method further comprises:

in a case that both the first resource selection mode and the second resource selection mode are used for performing the target operation and that either the first resource selection mode or the second resource selection mode triggers resource re-selection, determining a target candidate resource set based on the candidate resource set determined by using the first resource selection mode and the second resource selection mode.

14. The method according to claim 13, wherein in a case that the target candidate resource set is determined by using the first resource selection mode and the second resource selection mode, the target candidate resource set is an intersection or a union of candidate resource sets determined by using the first resource selection mode and the second resource selection mode.

15. The method according to claim 4, wherein in a case that the target operation is resource re-selection, before the performing the target operation by using the resource selection mode determined, the method further comprises:

in a case that sidelink transmission resources reserved by the terminal are not in a recommended resource set, determining to trigger resource re-selection; or in a case that sidelink transmission resources reserved by the terminal are in a recommended resource set, determining to trigger resource re-selection.

16. The method according to claim 1, wherein after the determining a resource selection mode used for the target operation based on the specification of the protocol, or configuration of the control node, or pre-configuration of the control node, or the content indicated by another terminal, or by the terminal, the method further comprises:

in a case that the second resource selection mode is used for performing the target operation, transmitting signaling to a receive terminal so as to trigger the receive terminal to report the resource selection assistance information.

17. The method according to claim 1, wherein the indication information of the recommended resource set reflects the reception time period of another terminal, the second resource selection mode being the resource selection mode used for the target operation comprises:

for a transmission of medium access control protocol data unit (MAC PDU), if reserved transmission resources are not within the reception time period of the receiving terminal reflected by the indication information of the recommended resource set, performing resource re-selection.

18. The method according to claim 1, wherein the target operation is transmission resource re-selection, performing the target operation by using the resource selection mode determined comprises:

if reserved transmission resources are not within the reception time period of the receiving terminal, performing the transmission resource re-selection.

19. A terminal, comprising:
a processor; and
a memory storing programs or instructions that are capable of running on the processor, wherein the programs or instructions, when executed by the processor, cause the terminal to:
determine a resource selection mode usable for a target operation, wherein the resource selection mode comprises a first resource selection mode and a second resource selection mode, wherein resource selection assistance information is not considered in the first resource selection mode and the resource selection assistance information is considered for use of in the second resource selection mode;
in a case that both the first resource selection mode and the second resource selection mode are usable for the target operation, determine a resource selection mode used for the target operation based on specification of a protocol, or configuration of a control node, or pre-configuration of a control node, or a content indicated by another terminal, or by a terminal; and
perform the target operation by using the resource selection mode determined;
wherein determining the resource selection mode used for the target operation based on the content indicated by another terminal comprises:
determining the resource selection mode used for the target operation, according to content of resource selection assistance information received from a receiving terminal, wherein the resource selection assistance information comprises indication information of a recommended resource set; if the indication information of the recommended resource set indicates a reception time period of the receiving terminal, the resource selection mode used for the target operation is the second resource selection mode.

20. A non-transitory readable storage medium storing a program or instructions, wherein the program or instructions, when executed by a processor, cause the processor to:

determine a resource selection mode usable for a target operation, wherein the resource selection mode comprises a first resource selection mode and a second resource selection mode, wherein resource selection assistance information is not considered in the first resource selection mode and the resource selection assistance information is considered in the second resource selection mode;

in a case that both the first resource selection mode and the second resource selection mode are usable for the target operation, determine a resource selection mode used for the target operation based on specification of a protocol, or configuration of a control node, or pre-configuration of a control node, or a content indicated by another terminal, or by a terminal; and perform the target operation by using the resource selection mode determined;

wherein determining the resource selection mode used for the target operation based on the content indicated by another terminal comprises:

determining the resource selection mode used for the target operation, according to content of resource selection assistance information received from a receiving terminal, wherein the resource selection assistance information comprises indication information of a recommended resource set; if the indication information of the recommended resource set indicates a reception time period of the receiving terminal, the resource selection mode used for the target operation is the second resource selection mode.

* * * * *